Oct. 27, 1970  G. HIRS  3,535,852
HIGH TEMPERATURE DUST COLLECTOR
Filed Nov. 27, 1968  2 Sheets-Sheet 1

INVENTOR.
GENE HIRS.
BY
SETTLE, BATCHELDER & OLTMAN.
ATT'YS.

INVENTOR.
GENE HIRS.
BY
SETTLE, BATCHELDER & OLTMAN.
ATT'YS.

United States Patent Office 3,535,852
Patented Oct. 27, 1970

3,535,852
HIGH TEMPERATURE DUST COLLECTOR
Gene Hirs, Birmingham, Mich., assignor to Hydromation Engineering Company, Livonia, Mich., a corporation of Michigan
Continuation-in-part of application Ser. No. 681,634, Nov. 9, 1967. This application Nov. 27, 1968, Ser. No. 779,372
Int. Cl. B01d 46/04
U.S. Cl. 55—302                                    5 Claims

ABSTRACT OF THE DISCLOSURE

A dust collector for efficiently separating dust from dust laden gases at high temperatures, for example flue gases from industrial stacks. A number of individual filtering tube assemblies are mounted to extend vertically from a partition within a closed housing, the partition dividing the interior of the housing into a lower or filtering chamber and an upper or outlet chamber. The tube assemblies are detachably supported on the lower ends of outlet conduits which pass through the partition, communication between the filtering chamber and the outlet chamber being via the filtering tube assembly and conduit. Dust laden gas to be filtered is fed into the filtering chamber in a fashion such that it is diffused laterally across the chamber and directed into a downward flow along the outer sides of the tube assemblies so that the entire length of the filtering tube assembly can be effectively employed in the filtering process. The filtering media takes the form of a refractory ceramic fibrous material having a melting point in excess of 3000° F., this material being asembled into the individual tube assemblies in the form of an annular blanket sandwiched between inner and outer sleeves of a perforate metal, such as stainless steel. During operation, the tube assemblies are sequentially subjected to a reverse flow or back-flushing cycle in which gas under pressure is forced through the tube assembly in a reverse direction to blow dust collected in the filter media back into the filter chamber into the downwardly directed flow pattern so that the separated dust particles are continuously urged toward a collecting hopper at the bottom of the filtering chamber.

REFERENCE TO RELATED APPLICATION

This application is a continuation-in-part of my copending application Ser. No. 681,634, filed Nov. 9, 1967, now abandoned.

BACKGROUND OF THE INVENTION

Due to the great concern about air pollution at the present time, there has been considerable interest in systems and methods for filtering flue gases from various types of operations. Although electrostatic filters and high pressure drop Venturi scrubbers do a fairly efficient job, there has been a need for an even more efficient filtering system which will result in a greater degree of clarity in the effluent. Also, with any type of wet scrubbing system, air pollution is eliminated, but a water pollution problem is created. Handling of the polluted water is sometimes more difficult and more expensive than the handling of the flue gases. Futhermore, in many cases, it would be advantageous ot obtain a dry particulate dust as the byproduct of the filtration operation.

Another way of filtering dust laden gases such as flue gases is to pass the gas through filter tubes of gas permeable material suspended in a dust collector housing. Where the gases are at low temperatures, filter tubes or bags of Dacron or Orlon materials can be utilized and will provide a very high degree of clarity in the filtered gases. However, these materials will not withstand high temperatures, say over 350° F. Fiberglass bags have been used where the temperature of the gases has been as high as 600° F., but fiberglass is made of woven material and does not achieve high efficiency filtration. So, in order to use the fiberglass bag, an initial dirt load has to be built up on the bag, and the dirt itself serves as a filter medium which will achieve fine filtration. Such bags are usually back-flushed periodically, and at the start of each filtration cycle, a considerable amount of dirt passes through the bag.

Furthermore, fiberglass bags are relatively ineffective at high flow rates, say about 10 cubic feet per minute per square foot of filter medium. At these flow rates, it is not possible to achieve a desired degree of clarity in the filtered gases. Also, the continuous flexing that the bags have to undergo as a result of back-flushing might cause structural failure of the fiberglass material.

Thus, there has been a need for improved high temperature dust collector bags for the filtering of gases at temperatures in excess of 350° F.

Various objects and features of the invention will become apparent by reference to the following specification and to the drawings.

Figure 1:
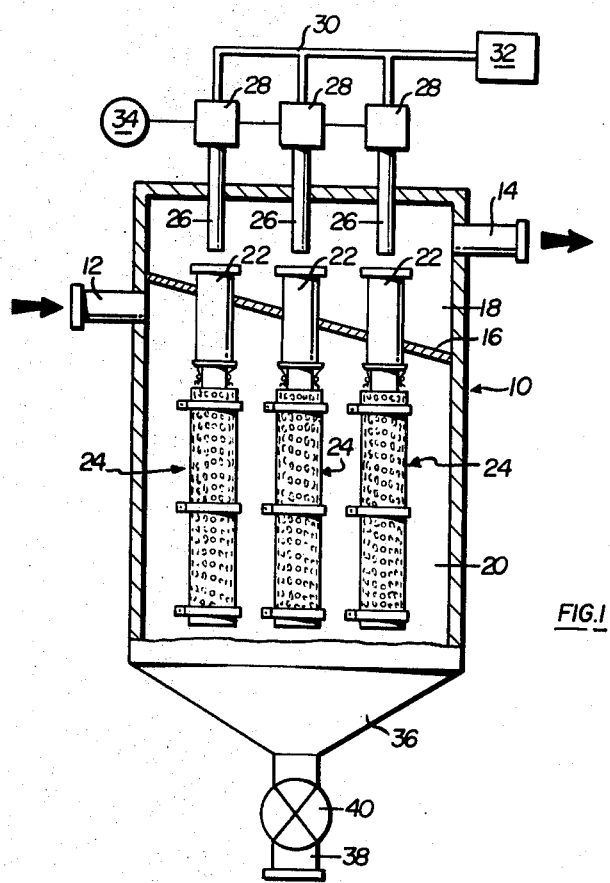
FIG. 1 is a side elevational view, partially in cross section and partially schematic of one form of high temperature dust collector embodying the present invention.

Referring first to FIG. 1, there is shown a preferred embodiment of high temperature dust collector embodying the present invention. The collector of FIG. 1 includes a closed housing 10 having an inlet 12 through which dust laden gas at high temperature flows into the interior of housing 10, and an outlet 14 from which filtered gas is discharged from the interior of housing 10. In the interior of housing 10, a wall or partition 16 divides the housing vertically into two chambers, an outlet chamber 18 which communicates with outlet 14 and a lower filtering chamber 20 into which the dust laden gas flows through inlet 12. A plurality of vertically extending tubular conduits 22 are mounted in wall 16 and extend through the wall to provide fluid communication from chamber 20 to chamber 18. A filter tube assembly designated generally 24 is secured to the lower end of each of conduits 22 to define an extention of the conduit. Tube assemblies 24 will be described in greater detail below and function to filter dust from gas flowing from chamber 20 through tube assemblies 24 into conduits 22.

In the structure of FIG. 1, it will be noted that the dividing wall or partition 16 is inclined downwardly in its extent away from inlet 12 so that dust laden gas flowing into filtering chamber 20 from inlet 12 is deflected downwardly along the outer sides of tube assemblies 24 by the inclination of walls 16.

A plurality of open ended gas discharge tubes are mounted in the upper wall of housing 10, each of the discharge tubes 26 being in axial alignment with the open upper end of a conduit 22. Each of discharge tubes 26 is connected via a solenoid controlled on-off type valve 28 of any suitable commercially available construction to a manifold 30 which is in turn connected to a suitable source of gas under pressure schematically illustrated at 32. The operating solenoids of valves 28 are controlled by an electrical control circuit schematically illustrated at 34 which is designed to actuate the valves 28 in a selected sequence to their open position to selectively connect one or more of the discharge conduits 26 to pressure source 32, for a purpose which will be described below.

At the lower end of housing 10, a dust collecting hopper 36 defines the bottom of housing 10, and a dust discharge conduit 38, provided with a rotary discharge lock 40 is employed to remove collected dust from the interior of housing 10.

Figure 2:
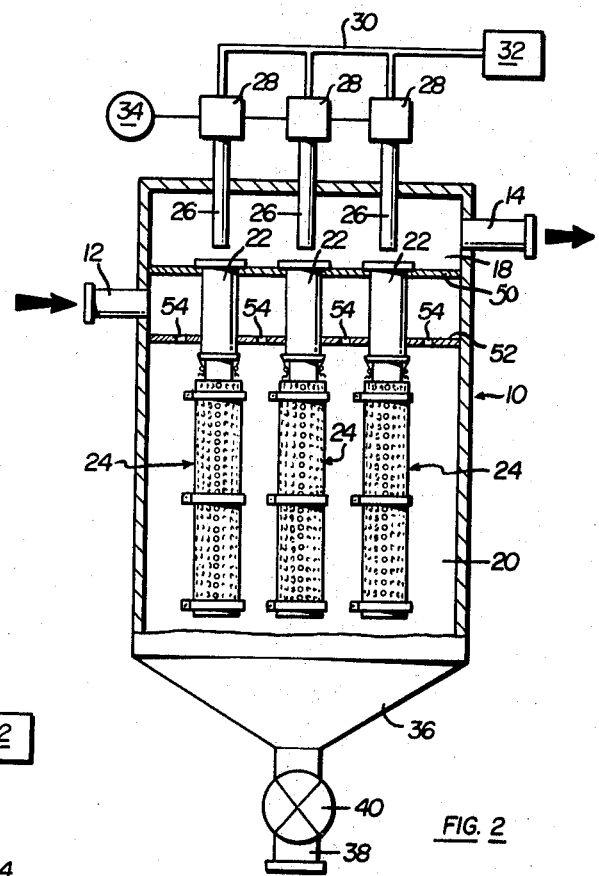
FIG. 2 is a side elevational view, similar to FIG. 1, of a second form of dust collector embodying the present invention.

In FIG. 2, a modified form of dust collector is illustrated, the FIG. 2 form differing from that of FIG. 1 solely in the structure of the partition assembly employed to separate the filter chamber from the outlet chamber. In view of the fact that the partition structure represents the only difference between the embodiments, only the partition structure of FIG. 2 will be described.

In the FIG. 2 embodiment, a horizontal wall 50 is mounted in the interior of the housing above inlet 12. Conduits 22 open into the outlet chamber 18 which is located above wall 50. Conduits 22 extend downwardly through a second horizontal wall 52 mounted in the interior of housing 10 below inlet 12. The lower wall 52 is formed with a series of openings as at 54 so that dust laden gas passing from the intermediate chamber between walls 50 and 52 into filtering chamber 20 is directed axially downwardly along the outer sides of tube assemblies 24.

Apart from the variance in structure between wall 16 of the FIG. 1 embodiment and walls 50 and 52 of the FIG. 2 embodiment, the remaining structure and functions are common between the two embodiments.

Figure 3:
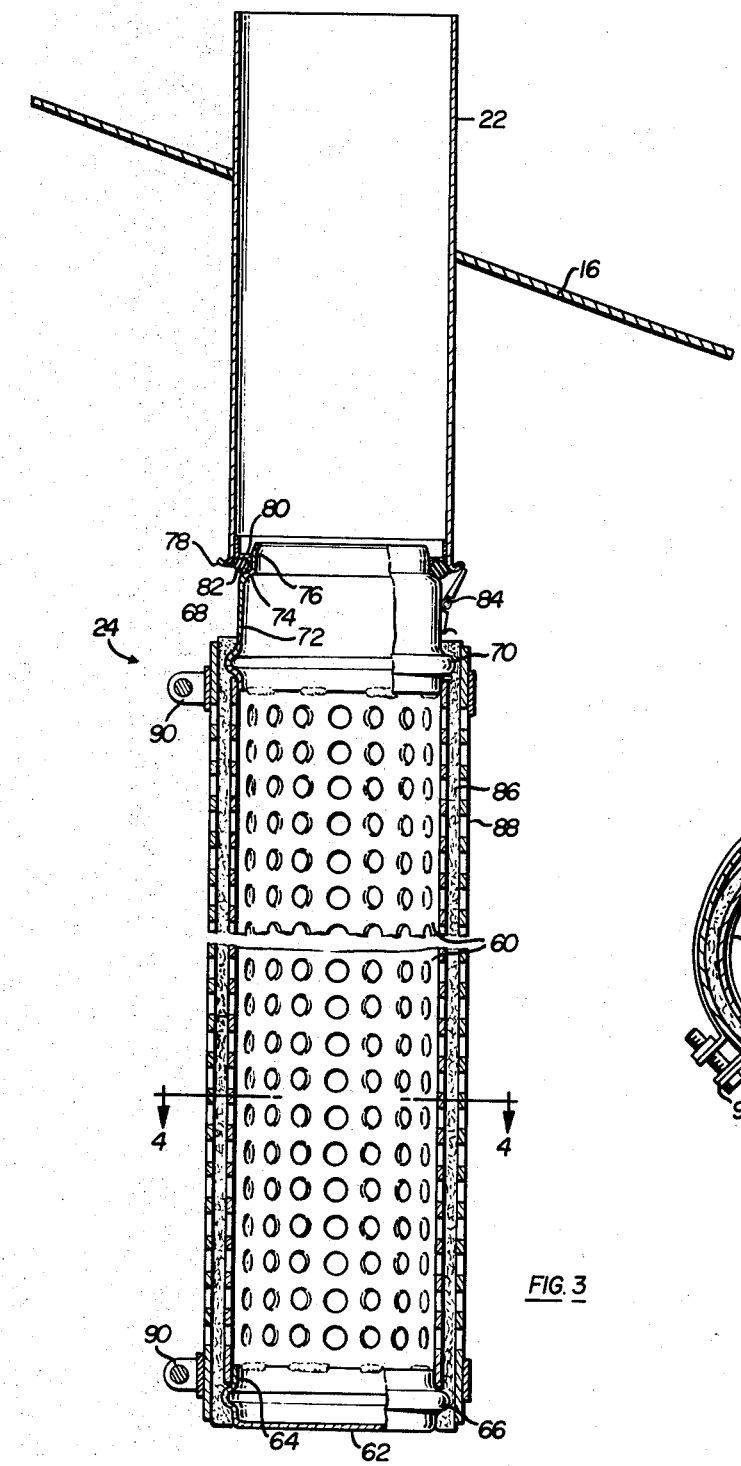
FIG. 3 is a detail cross sectional view taken on a central vertical plane through a filter tube assembly embodying the present invention, with certain parts broken away.
Figure 4:
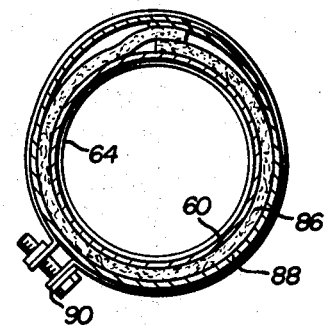
FIG. 4 is a detail cross sectional view taken on a horizontal plane at approximately the line 4—4 of FIG. 3.

The structural details of tube assemblies 24 are shown in FIGS. 3 and 4. The foundation of the individual tube assemblies 24 is an inner sleeve of perforated sheet metal material 60 which is formed into a hollow cylindrical shape and welded into tubular form. At the lower end of inner sleeve 60, a cup-shaped closure cap 62 is fixedly secured, as by welding, to the lower end of sleeve 60. The upper end of cap 62 fits into the lower end of sleeve 60, and the cap is formed with a side wall or skirt portion 64 which extends axially downwardly below the end of sleeve 60. A radially outwardly projecting annular shoulder is formed on skirt section 64 for a purpose to be described below.

At the upper end of inner sleeve 60, a tubular adaptor thimble 68 is fixedly secured, as by welding, to the upper end of inner sleeve 60 to form an upward extension of the sleeve. Like closure cap 62, an outwardly projecting annular shoulder 70 is formed on thimble 68 on a skirt portion 72 which extends axially above the upper end of inner sleeve 60. At the upper end of skirt 72, an inwardly inclined sealing shoulder 74 is formed on thimble 68. Annular seating projection 76 projects axially from the upper end of shoulder 74.

As best seen in FIG. 3, the open lower end of conduit 22 is reversely bent as at 78 to form an upwardly facing annular retaining lip. An annular seal retainer 80 is fixedly secured, as by welding, to the interior of conduit 22 slightly above its lower end to define a downwardly opening retaining recess into which a sealing element 82, which may take the form of an annular asbestos packing, is received.

A plurality of snap-type hook fasteners 84 are mounted upon skirt portion 72 of the thimble and are engageable with the retaining lip 78 on conduit 22 to detachably mount the thimble on the lower end of the conduit as shown in FIG. 3. The fasteners 84 are of the over center snap-type and axially draw thimble 68 upwardly to force shoulder 74 into sealing engagement with backing 82. In the usual case, three or four snap fasteners 84 will be symmetrically spaced around the periphery of the annular thimble.

A blanket 86 of bulk ceramic fiber material is wrapped around the outer periphery of inner sleeve 60, the blanket extending axially from a location above shoulder 70 on thimble 68 to a location axially below the corresponding shoulder 66 on closure cap 62. The material of blanket 86, because of the high temperature environment in which it is employed preferably has a melting point of greater than 3000° F. A suitable material for this purpose is commercially available from The Carborundum Company of Niagara Falls, New York, and is sold under the trade name "Fiberfrax Lo-Con Blanket." This material has the following approximate chemical analysis (percentages are by weight):

| | Percent |
|---|---|
| $Al_2O_3$ | 50.9 |
| $SiO_2$ | 46.8 |
| $B_2O_3$ | 1.2 |
| $Na_2O$ | 0.8 |
| Trace inorganics | 0.3–0.5 |

This material is stated by the manufacturer to have a melting point of 3200° F. and is recommended for continuous use at temperatures up to 2300° F. Other materials of generally similar properties may be used, in general such materials will usually consist of approximately equal parts by weight of $Al_2O_3$ and $SiO_2$, these materials generally constituting at least 95 percent by weight of the material.

A sheet of perforated metal, such as stainless steel, is wrapped around the outer periphery of blanket 86 to constitute an outer sleeve 88 which, as seen in FIG. 3, is of substantially the same axial extent as blanket 86, both blanket 86 and outer sleeve 88 extending axially beyond the shoulders 66 and 70 which in turn are axially beyond the opposite ends of the perforated inner sleeve 60. At spaced axial positions along the assembly, cinch-type clamping straps 90 extend circumferentially around the outer side of outer sleeve 88 to circumferentially clamp the outer sleeve and blanket against the outer side of the inner sleeve assembly. Two of clamping straps 90 are engaged with outer sleeve 88 in radial alignment with the annular shoulders 66 and 70 on closure cap 62 and thimble 68 respectively. These straps, when tightened, firmly clamp and crush blanket 86 against the outwardly projecting annular shoulders 66 and 70 to thereby form an annular, gas impermeable seal between the inner and outer sleeves at each end.

As will be noted from FIG. 4, the sheet of perforated metal employed to form outer sleeve 88 is wrapped around blanket 86 with a slight degree of circumferential overlap. The overlapped ends of the sheet are not secured to each other, so that in the event it becomes necessary to replace the blanket, the clamps 90 may be undone to make the blanket accessible for replacement. The entire tube assembly may be readily detached from its conduit 22 by undoing the snap fasteners 84 to make blanket replacement more convenient.

Before describing the operation of the dust collector, it should be pointed out that FIG. 1 and 2 are essentially of a schematic nature. Although only three tube assemblies 24 are illustrated in these figures, in actual practice an installation of this type may consist of approximately 150 tube assemblies, each of which will be approximately eight feet in length and have an external diameter of the order of ten inches.

In operation, the dust laden gas is fed into inlet tube 12 and diffused horizontally across the entire interior of housing 10. The incoming flow of gas is directed, either by the downwardly inclined partition wall 16 or by the openings 54 of the FIG. 2 embodiment into a directed flow downwardly along the outer sides of the tube assemblies. Preferably, outlet 14 is connected to the intake side of a pump so that a fairly constant gas flow is induced axially upwardly through the interior of inner sleeve 60 and conduits 22. Dust carried into the filter chamber 20 by the incoming dust laden gas is trapped by the fibers of blanket 86 as the gas flows radially of the tube assembly through the perforations in outer sleeve 88, blanket 86 and the perforations of inner sleeve 60, the filtered gas then flowing axially upwardly through the interior of the inner sleeve, conduit 22 and into outlet chamber 18.

Because the environment in which collectors of this type are employed requires the collector to handle a continuous and uninterrupted incoming flow of dust laden gas, it is not practical to shut the filter down for cleaning purposes. In order to prevent the dust load within the blankets from building up to an undesirable amount, the tube assemblies are periodically back-flushed by discharging a jet of gas under pressure from the discharge conduits 26 into the interior of the aligned conduit 22, to temporarily establish a reverse direction flow of gas radially outwardly from the inner sleeve through the blanket to blow back dust collected in the blanket outwardly through the perforations of outer sleeve 88 into the downwardly directed flow of dust laden gas continuously fed into the filtering chamnber 20 through the inlet. In order to establish this reverse flow, it is necessary that the gas discharged from the discharge conduits 26 be discharged under a pressure sufficient so that its normal velocity of flow is at least one and one-half times that of the opposing normally induced upward flow through the interior of the conduit and tube assemblies.

In order that the filter can continue effective filtering operation at all times, the tube assemblies of the installation are divided into groups, each group consisting of less than 15 or 20 percent of the total number of tube assemblies involved in the installation. The groups thus established are periodically back-flushed sequentially so that at any given time at least 80 to 85 percent of the tubes are in normal filtering operation.

In should be noted that because incoming flow from the inlet is continuously maintained, the normal flow patterns established during normal operation are effectively employed to assist in the ultimate separation of dust from the gas in that back-flushed dust discharged from a tube assembly during the back-flushing operation is discharged into the downwardly flowing incoming dust laden gas, hence the dust particles are urged toward the dust collecting hopper at the bottom of the filtering chamber. Thus, the dust particles are progressively urged toward the collecting hopper.

While exemplary embodiments have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. For use in a high temperature dust collector for filtering dust laden gases at temperatures up to 2300° F., said dust collector having an open ended tubular outlet conduit; a filter tube assembly comprising a hollow cylindrical inner sleeve of perforate metal, an annular closure cup secured to the lower end of said inner sleeve, adaptor thimble means fixed to the upper end of said inner sleeve adapted to sealingly secure said inner sleeve to the inlet end of said outlet conduit, a blanket of fibrous gas permeable dust filter media wrapped about the outer periphery of said inner sleeve and extending axially from said adaptor thimble to said closure cup, said filter media being a bulk ceramic fiber material having a composition consisting of approximately equal parts by weight of $Al_2O_3$ and $SiO_2$ and less than five percent by weight of other materials and having a melting point of over 3000° F., a sheet of perforate metal material wrapped about the upper side of said blanket to define an outer sleeve, said sheet extending axially to overlap said closure cup and at least a portion of said adaptor thimble, and a plurality of clamping strap means extending circumferentially around the outer sleeve to circumferentially clamp said outer sleeve and said blanket against the outer periphery of said inner sleeve.

2. The invention defined in claim 1 wherein said closure cup and said thimble each include an annular skirt portion extending axially beyond the respective ends of said inner sleeve, an outwardly projecting annular surface on each of said skirt portions, said blanket and said outer sleeve extending axially beyond both of said annular projections, one of said clamping strap means extending circumferentially around said outer sleeve in alignment with each of said projections to squeeze the blanket against the projections to constitute a substantially gas impermeable annular seal between the blanket and inner sleeve at the upper and lower ends of said inner sleeve.

3. The invention as defined in claim 2 wherein said adaptor thimble extends axially upwardly beyond the upper end of said outer sleeve, said outlet conduit having a downwardly facing annular sealing means at its open lower end, a complementary annular sealing surface on said extended portion of said thimble adapted to sealingly engage said sealing means on said outlet conduit, and releasable fastening means on said extended portion of said thimble engageable with cooperating means on the exterior of said outlet conduit for detachably securing said tube assembly to said outlet conduit.

4. A dust collector for filtering dust laden gases at temperatures up to 2300° F. comprising a housing having an interior wall dividing said housing into an outlet chamber and a filtering chamber located respectively above and below said wall, a plurality of tubular conduits mounted in and extending downwardly from said wall into said filtering chamber to place said outlet chamber in communication with said filtering chamber, a plurality of gas permeable filter tube assemblies having their upper ends secured to the lower ends of said conduits, each of said tube assemblies comprising a hollow cylindrical inner sleeve of perforate metal sealingly secured at its upper end to one of said conduits to constitute an extension of said conduit into the filtering chamber, means closing the lower end of the inner sleeve, a blanket of bulk ceramic gas permeable fibrous material having a melting point of at least 3000° F. wrapped about the periphery of said inner sleeve, a sheet of perforate metal material circumferentially wrapped about the exterior of said blanket, and clamping means circumferentially clamping said sheet and said blanket to said inner sleeve, inlet means for flowing dust laden gas into said filtering chamber across the entire lower surface of said wall and for directing the flow of dust laden gas downwardly from said wall along the outer sides of said tube assemblies, means for establishing an upward flow of gas in the interior of the inner sleeves of said tube assemblies to draw gas from said filtering chamber through the blanket into the interior of said inner sleeve, and means operable during operation of said inlet means for periodically discharging gas downwardly through selected ones of said conduits and the interior of each of said tube assemblies at a velocity at least one and one-half times the upward velocity of flow induced by said flow inducing means to dislodge dust collected in the blanket outwardly from the tube assembly into the downwardly directed flow of dust laden gas along the outer sides of said tube assemblies.

5. In a dust collector as defined in claim 4; the improvement wherein said means for periodically discharging gas downwardly through said conduits comprises a gas discharge tube associated with each of said conduits, a source of gas under pressure, and means for connecting said discharge conduits to said source in groups consisting of less than 20 percent of the total number of said conduits.

References Cited

UNITED STATES PATENTS

| | | | |
|---|---|---|---|
| 1,892,210 | 12/1932 | Gordon | 55—486 X |
| 1,898,027 | 2/1933 | Winslow | 55—486 |
| 2,402,140 | 6/1946 | Heintzelman | 55—419 |
| 2,526,651 | 10/1950 | Garbo | 260—449.6 |
| 2,747,686 | 5/1956 | Riley et al. | 55—486 |
| 2,765,047 | 10/1956 | Hersey | 55—341 X |
| 2,784,846 | 3/1957 | Olson et al. | 210—333 X |
| 2,804,168 | 8/1957 | Church | 55—302 |
| 2,892,510 | 6/1959 | Wygant | 55—523 X |
| 3,073,097 | 1/1963 | Hallett et al. | 55—302 X |

DENNIS E. TALBERT, Jr., Primary Examiner

U.S. Cl. X.R.

55—341, 379, 486, 523, 527; 210—333, 484, 497, 500